US010215895B2

(12) United States Patent
Wei et al.

(10) Patent No.: US 10,215,895 B2
(45) Date of Patent: Feb. 26, 2019

(54) LIQUID CRYSTAL GRATING FORMING LENTICULAR LENSES

(71) Applicant: BOE TECHNOLOGY GROUP CO., LTD., Beijing (CN)

(72) Inventors: Wei Wei, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 184 days.

(21) Appl. No.: 13/824,626

(22) PCT Filed: Nov. 7, 2012

(86) PCT No.: PCT/CN2012/084238
§ 371 (c)(1),
(2) Date: Mar. 18, 2013

(87) PCT Pub. No.: WO2013/135063
PCT Pub. Date: Sep. 19, 2013

(65) Prior Publication Data
US 2013/0242235 A1 Sep. 19, 2013

(30) Foreign Application Priority Data

Mar. 15, 2012 (CN) .......................... 2012 1 0069353
May 18, 2012 (CN) .......................... 2012 1 0156961

(51) Int. Cl.
G02F 1/1335 (2006.01)
G02B 6/02 (2006.01)
(Continued)

(52) U.S. Cl.
CPC ........... G02B 5/18 (2013.01); G02B 27/2214 (2013.01); G02F 1/133504 (2013.01)

(58) Field of Classification Search
CPC combination set(s) only.
See application file for complete search history.

(56) References Cited

U.S. PATENT DOCUMENTS

2007/0040780 A1* 2/2007 Gass ................. G02F 1/134363
345/87
2007/0097293 A1* 5/2007 Nakanishi et al. ............. 349/95
(Continued)

FOREIGN PATENT DOCUMENTS

CN 101025490 A 8/2007
CN 101339345 A 1/2009
(Continued)

OTHER PUBLICATIONS

Korean Examination Opinion Appln. No. 10-2013-7009791; dated Aug. 27, 2014.
(Continued)

Primary Examiner — Lauren Nguyen
(74) Attorney, Agent, or Firm — Ladas & Parry LLP

(57) ABSTRACT

Embodiments of the present invention provide a lenticular lens grating, a liquid crystal grating and a display device. The lenticular lens grating comprises: a plurality of lenticular lenses arranged in parallel, wherein at least two adjacent lenticular lenses have a spacing therebetween, the spacing comprises a first plane perpendicular to the central axes of the lenticular lenses, and/or a middle portion of the upper surface of at least one lenticular lens is a second plane which is perpendicular to the central axis of the at least one lenticular lens and symmetrical with respect to the central axis of the at least one lenticular lens as a symmetric axis. With the structure of the lenticular lens grating, it is possible that the black matrix patterns on the color filter is not deflected by refraction of the lenticular lens, thus the Moire effect can be effectively depressed and 3D display effect can be notably improved.

9 Claims, 6 Drawing Sheets

(51) Int. Cl.
  *G02B 5/18* (2006.01)
  *G02B 27/22* (2018.01)

(56) References Cited

U.S. PATENT DOCUMENTS

| | | | |
|---|---|---|---|
| 2007/0195410 | A1 | 8/2007 | Yun et al. |
| 2007/0296911 | A1 | 12/2007 | Hong |
| 2008/0036759 | A1* | 2/2008 | Koike ............... G02F 1/133526 345/419 |
| 2008/0225373 | A1 | 9/2008 | Hamagishi et al. |
| 2009/0015739 | A1 | 1/2009 | Shin et al. |
| 2009/0262420 | A1 | 10/2009 | Yun et al. |
| 2011/0157499 | A1 | 6/2011 | Lee et al. |
| 2011/0164318 | A1 | 7/2011 | Yun et al. |
| 2014/0063367 | A1 | 3/2014 | Yang et al. |

FOREIGN PATENT DOCUMENTS

| | | | |
|---|---|---|---|
| CN | 101419351 A | | 4/2009 |
| CN | 101566729 A | | 10/2009 |
| CN | 102062965 A | | 5/2011 |
| CN | 10-2109729 | * | 6/2011 ......... G02F 1/13394 |
| CN | 102109706 A | | 6/2011 |
| CN | 102109729 A | | 6/2011 |
| CN | 102253563 A | | 11/2011 |
| CN | 102279500 A | | 12/2011 |
| CN | 102289016 A | | 12/2011 |
| CN | 102289113 A | | 12/2011 |
| CN | 102305984 A | | 1/2012 |
| CN | 202183086 U | | 4/2012 |
| CN | 102662208 A | | 9/2012 |
| CN | 102707471 A | | 10/2012 |
| DE | 10252830 B3 | | 5/2004 |
| JP | 0862533 A | | 3/1996 |
| JP | 0973077 A | | 3/1997 |
| JP | 09133892 A | | 5/1997 |
| JP | 3200335 B2 | | 8/2001 |
| JP | 2005-157332 A | | 6/2005 |
| JP | 2008-009370 A | | 1/2008 |
| JP | 2008-083463 A | | 4/2008 |
| JP | 2008-225334 A | | 9/2008 |
| JP | 2008-157302 A | | 7/2009 |
| JP | 2010-231010 | * | 10/2010 ............. G02B 27/22 |
| JP | 2010-231010 A | | 10/2010 |
| JP | 2012-018245 A | | 1/2012 |
| KR | 20060033815 A | | 4/2006 |
| KR | 20090111584 A | | 10/2009 |
| WO | 0120386 A2 | | 3/2001 |

OTHER PUBLICATIONS

Chinese Notice of Reexamination Appln. No. 201210156961.2; dated Sep. 4, 2014.
International Preliminary Report on Patentability Appln. No. PCT/CN2012/084238; dated Sep. 16, 2014.
International Search Report; dated Jul. 2, 2013; PCT/CN2012/084238.
Chinese Rejection Decision dated Jan. 16, 2014; Appln. No, 201210156961.2.
Korea Examination Opinions dated Feb. 25, 2014; Appln. No. 10-2013-7009791.
Chinese Patent Certificate Appln. No. 201210156961,2; Dated May 20, 2015.
Partial Supplemental European Search Report Appln. No. 12832704.6-1562/2662725 PCT/CN2012084238; dated Jun. 30, 2015.
Extended European Search Report dated Oct. 22, 2015; Appln. No. 12832704.6-1562/2662725 PCT/CN2012084238.
Japanese Office Action dated Aug. 1, 2016; Appln. No. 2014-561262.
Second Japanese Office Action dated Apr. 3, 2017; Appln. No. 2014-561262.
Japanese Notice of Allowance dated Nov. 20, 2017; Appln. 2014-561262.
Chinese First Office Action dated Mar. 19, 2013; Appln. No. 201210156961.2.
Chinese Second Office Action dated Jul. 3, 2013; Appln. No. 201210156961.2.

* cited by examiner

LIQUID CRYSTAL GRATING FORMING LENTICULAR LENSES

TECHNICAL FIELD

Embodiments of the present invention relate to a lenticular lens grating, a liquid crystal grating and a display device.

BACKGROUND

With improvement of digital picture processing techniques and equipment manufacturing level, 3D display has become a great trend in display industry. Current 3D display generates three-dimension effect based on "parallax," that is, makes both eyes of a user watch different pictures by using certain facilities or techniques; the left eye only watches the pictures for the left eye, the right eye only watches the pictures for the right eye, and the pictures for the left and right eyes are taken at two different view angles, respectively, with respect to an object and thus are called three-dimensional picture pairs. The brain of the watcher combines these two kinds of pictures watched by both eyes to generate 3D effect accordingly.

The manner of realizing 3D display effect through a pair of 3D spectacles requires the user to wear a pair of 3D spectacles, but this manner has a severe influence upon the user experience, confines the user's freedom, and meanwhile has a negative effect upon the user who is near-sighted or far-sighted. Thus, naked-eye 3D display has increasingly become one favorable selection for users. Naked-eye 3D display techniques can be divided into two kinds of mainstream technologies, that is, parallax barrier (also called slit grating) and lenticular lens grating technologies.

A parallax barrier technology presents different pictures for both eyes of a user by arranging a barrier having a series of slit gratings before a display screen. However, due to the existence of the barrier, a portion of the light emitted from the display screen is inevitably be shielded. This makes not only the light from the display unable to be fully utilized, causing energy loss, but also the light transmittance restricted so that a certain negative influence occurs upon the display effect. Therefore, the application ratio for the techniques of slit grating is not very high, although it appears relatively early.

A lenticular lens grating technology is to arrange lenticular lenses closely before a display screen (the lenticular lenses may be convex lenses or concave lenses). A portion of the sub-pixel cells on the display present left eye pictures, while another portion present right eye pictures. Due to refraction of the lenses on the lenticular lens grating, the light from the left eye pixel cells and right eye pixel cells is deflected in its travel direction after passing through the lenticular lens grating, so as to make the light from the left eye pixels enter a user's left eye, and the light from the right eye pixels enter the user's right eye.

In the lenticular lens gratings of the prior art, the lenticular lens grating as shown in FIG. 1 (a) is of a convex lens structure, where semilenticular lenses are arranged together in parallel and closely to deflect light; and the lenticular lens grating as shown in FIG. 1 (b) is of a concave lens structure, where concave lenticular lenses are arranged together in parallel and closely to deflect light. Due to deflection of light based on lens principle, the black matrix exists between respective sub-pixels cells of the color filter will be seen as deformed under the affection of the lenses, thus the deformed black matrix causes Moire (that is, interference stripes) in the pictures watched by a user, severely affecting the visual effect of pictures.

SUMMARY

The embodiments of the present invention resolve the problem in prior art that Moire influences display effect in forming image with a lenticular lens grating, provide a lenticular lens grating, a liquid crystal grating and a display device, and effectively reduce the Moire effect in display.

One aspect of the present invention provides a lenticular lens grating, comprising a plurality of lenticular lenses arranged in parallel. At least two adjacent lenticular lenses have a spacing therebetween, the spacing comprises a first plane perpendicular to the central axes of the lenticular lenses, and/or a middle portion of the upper surface of at least one lenticular lens is a second plane which is perpendicular to the central axis of the at least one lenticular lens and symmetrical with respect to the central axis of the at least one lenticular lens as a symmetric axis.

In the lenticular lens grating, for example, a width N1 of the first plane is equal to a width W of a black matrix between color sub-pixel cells on a corresponding color filter; and/or a width N2 of the second plane is N2=S/(S+h)*W, where h is a distance of the grating away from the color filter, and S is an optimal watching distance for 3D display.

In the lenticular lens grating, for example, the lenticular lens is a convex lens or a concave lens.

In the lenticular lens grating, for example, an upper surface of the lenticular lens is a smooth curved surface or irregular curved surface.

Another aspect of the present invention further provides a display device, comprising a display panel and a lenticular lens grating as mentioned above, wherein the lenticular lens grating is arranged on an external surface of the color filter substrate of the display panel.

In the display device, for example, the lenticular lens grating is assembled in a manner in which the upper surface thereof faces the display panel of the display device or the upper surface is opposite to the display panel of the display device.

In the display device, for example, a grid pitch P for the lenticular lens grating is:

$$P = \frac{2S_p}{1 + S_p/L},$$

where Sp is a width of sub-pixel cells of the color filter, and L is a semi-interocular distance of a user.

In the display device, for example, the display device may further comprise a polarization sheet, wherein the lenticular lens grating is provided on the polarization sheet, and the polarization sheet is provided on the external surface of the color filter substrate of the display panel.

Still another aspect of the present invention further provides a liquid crystal grating, comprising an upper substrate and a lower substrate, a liquid crystal layer arranged between the upper and lower substrates, and a first electrode layer arranged on an internal surface of the upper substrate and a second electrode layer arranged on an internal surface of the lower substrate. The second electrode layer is a plain electrode, and the first electrode layer comprises a plurality of electrode units, which are each composed of two or more parallel strip electrodes in parallel and separated from each other within a same plane; or the second electrode layer is a plain electrode, and the first electrode layer comprises a plurality of electrode units, which are each composed of two or more parallel strip electrodes in parallel and separated from each other within a same plane.

In the liquid crystal grating, for example, the electrode unit is composed of two parallel and equidistant single-layered strip electrodes. Alternatively, the electrode units is composed of more than two parallel and equidistant single-layered strip electrodes, and a width of the strip electrode shared by two adjacent electrode units is greater than a width of the other strip electrode(s) within each electrode unit.

In the liquid crystal grating, for example, the electrode unit is in a double-layered electrode structure composed of an upper electrode layer and a lower electrode layer separated by a transparent insulating layer, and a width of the upper electrode layer is less than a width of the lower electrode layer.

For example, the lens formed by the liquid crystal grating is a convex lens or a concave lens.

Yet another aspect of the present invention further provides a display device, comprising a display panel and a liquid crystal grating as mentioned above, wherein the liquid crystal grating is arranged on an external surface of the color filter substrate of the display panel.

In the display device, for example, a grid pitch P for the lenticular lens grating is:

$$P = \frac{2S_p}{1 + S_p/L},$$

where Sp is a width of sub-pixel cells of the color filter, and L is a semi-interocular distance of a user.

In the display device, for example, the display device further comprises a polarization sheet, wherein the lenticular lens grating is provided on the polarization sheet, and the polarization sheet is provided on the external surface of the color filter substrate of the display panel.

In the embodiments of the present invention, with the improved structure of the lenticular lens grating, the black matrix pattern on the color filter is not deflected to deform by the refraction of a lenticular lens, thus effectively depressing Moire effect and notably improving the 3D display effect. Furthermore, in manufacturing of the lenticular lens grating of an embodiment of the present invention, a desirable display effect can be reached through a flexible regulation of the grating parameters according to display structural features and actually employed technology, thus greatly reducing the difficulty of technology development, simplifying the development procedure and also enhancing the product yield.

BRIEF DESCRIPTION OF THE DRAWINGS

A general introduction of the drawings for embodiments will be made in the following to afford more clear description for the technical solution of the embodiments of the present invention, and obviously, the drawings in the following description just relate to some embodiments of the present invention, rather than limitation to the present invention.

FIG. 1 (b) is a principle schematic view illustrating generation of Moire in the concave lenticular lens grating of prior art;

FIG. 2 (b) is a partial enlarged view of the cross-section structure of the concave lenticular lens grating of embodiment 2 of the present invention;

FIG. 3 (b) is a principle schematic view illustrating depression on Moire in the concave lenticular lens grating of embodiment 2;

DETAILED DESCRIPTION

To make clearer the aim, technical solutions and advantages of the embodiments of the present invention, a clear and complete description about the technical solution of the embodiment of the present invention will be made with reference to the accompanying drawings of the embodiments of the present invention. Obviously, the described embodiments are merely part of the embodiments of the present invention, but not all the embodiments. Based on the described embodiments of the present invention, all the other embodiments acquired by the ordinary skilled in this art, without any creative labor, fail into the protective scope of the present invention.

Unless otherwise defined, all the technical and scientific terms used herein have the same meanings as commonly understood by one of ordinary skill in the art to which the present invention belongs. Terms such as "first," "second," etc., which are used in the description and the claims of the present application for invention, are not intended to indicate any sequence, amount or importance, but distinguish various components. Also, the terms such as "a," "an," "the," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. Terms such as "on," "under," "right," "left" and the like are only used to indicate relative position relationship, and when the position of the object which is described is changed, the relative position relationship may be changed accordingly.

Because the circular lenticular lens in the lenticular lens grating of prior art will amplify the black matrix region watched by a user when deflecting light, the embodiments of the present invention make further improvements upon the structure of lenses, so that the lenticular lens grating will not deflect the light from the black matrix and thus does not make formed images deform, thereby effectively depress generation of Moire.

Embodiment 1

Figure 1A:
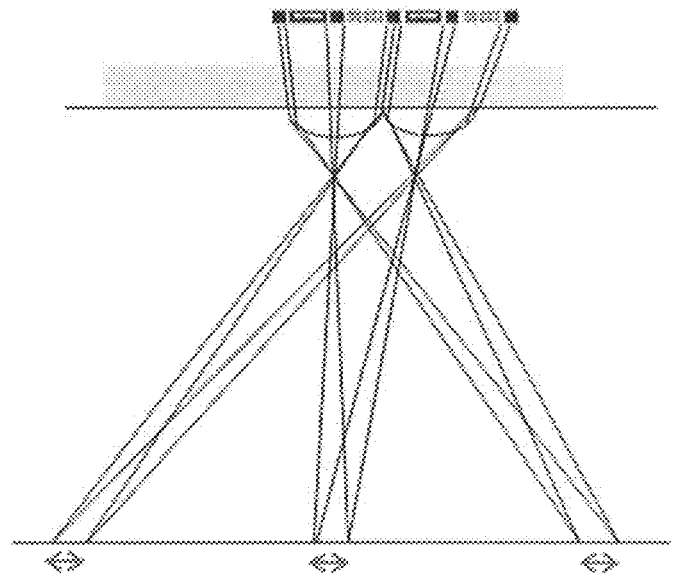
FIG. 1 (a) is a principle schematic view illustrating generation of Moire in the convex lenticular lens grating of prior art.
Figure 1B:
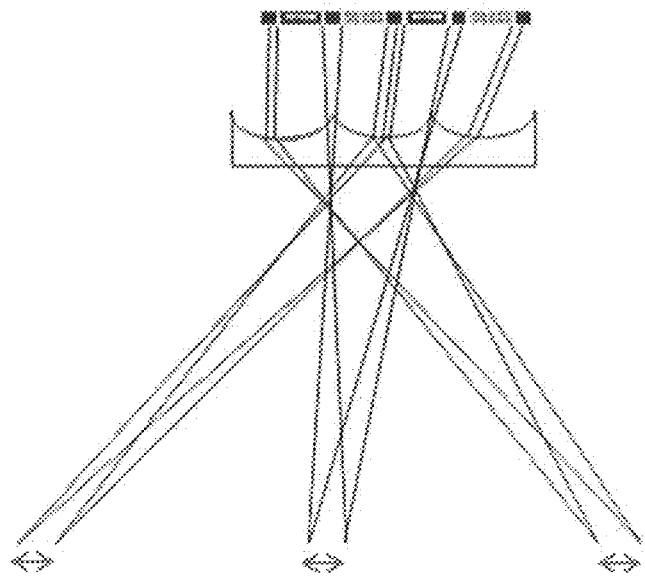
Figure 2A:
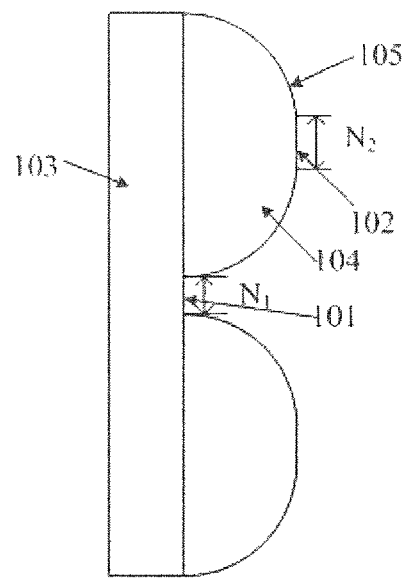
FIG. 2 (a) is a partial enlarged view of the cross-section structure of the convex lenticular lens grating of embodiment 1 of the present invention.
Figure 2:
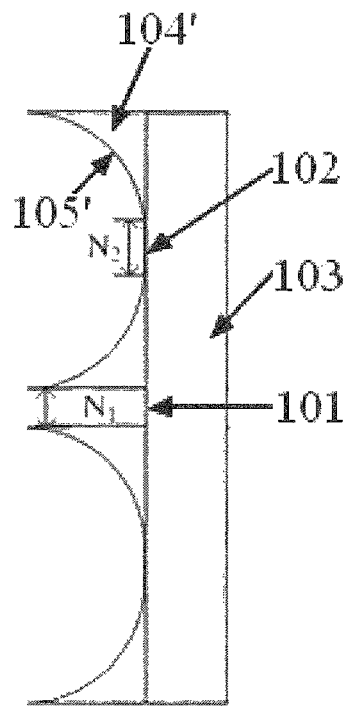

FIG. 2 is a partial sectional enlarged view of the lenticular lens grating of embodiment 1. In order to suppress the amplification effect of convex lenses upon the black matrix between respective pixels in a display panel, the lenticular lens grating of embodiment 1 is obtained through modification with respect to the close arrangement manner of circular lenticular lenses in prior art, and the lenticular lens grating is further provided with plane portions perpendicular to the central axes of the lenticular lenses. The central axis of a lenticular lens means the straight line connecting the focal points on both sides of the lens, which line usually is located at the right middle of the lens, and the light passing through the lens will not be deflected along such a direction of the central axis.

Specifically, a plurality of convex lenticular lenses 104 are formed on a substrate 103 in a parallel arrangement, every two lenticular lenses 104 are separated with a first plane 101 therebetween, the first plane 101 is perpendicular to the central axes of the lenticular lenses, and the width of the first plane 101 is N1; alternatively, the middle portion of the upper surface 105 of each lenticular lens 104 is formed with a second plane 102, the plane 102 is perpendicular to the central axis of the lenticular lens 104 and is symmetrical with respect to the central axis of the lenticular lens as a symmetric axis, and the width of the second plane 102 is N2.

Still further, the width N1 of the first plane may be equal to the width W of the black matrix between the color sub-pixel cells of a corresponding color filter; the width N2 of the second plane is N2=S/(S+h)*W, where h is the distance of the grating away from the color filter, and S is an optimal watching distance for 3D display. The corresponding color filter means the color filter of a display panel working in cooperation with the lenticular lens grating.

Embodiment 2

FIG. 2 (a) is an illustration taking convex lenses as an example, and FIG. 2(b) showing embodiment 2 further illustrates the lenticular lens grating formed with concave lenses in the embodiment.

In embodiment 2, a plurality of concave lenticular lenses 104' are formed on the substrate 103 in a parallel arrangement, and a plurality of plane portions perpendicular to the central axes of the lenticular lenses 104' are further included in the concave lenticular lens grating. Every two concave lenticular lenses 104' are separated by a first plane 101, the first plane 101 is perpendicular to the central axes of the lenticular lenses, and the width thereof is N1; alternatively, the middle portion of the upper surface 105' of each concave lenticular lens 104' is formed with a second plane 102, the second plane 102 is perpendicular to the central axis of the concave lenticular lens 104' and is symmetrical with respect to the central axis of the lenticular lens as a symmetric axis, and the width of the second plane 102 is N2. The optimal width for respective plane may be the same as that of above embodiment using convex lenses.

The those skilled in the art should appreciate that, in the above embodiments of convex lenses or concave lenses, the height of the first plane 101 between two lenticular lenses that is flush with the substrate at the bottom of the lenses is only a preferred example; in practice, it's sufficient as long as the top of the first plane 101 is a plane perpendicular to the central axis of the lenticular lens, and an actual height of the first plane 101 can be regulated according to the requirement by a manufacture technology.

It should be noted that, while every two lenticular lenses (convex lenses 104 or concave lenses 104') in the technical solutions in connection with the above embodiments of convex lenses or concave lenses (embodiment 1 or 2) are separated by a first plane 101, a second plane 102 may be further formed at the middle portion of the upper surface 105 or 105' of each lenticular lens (a convex lens 104 or a concave lens 104'), that is, the first planes 101 and the second planes 102 may be provided for the lenticular lens grating simultaneously.

Furthermore, although the cylinder surfaces are all smooth curved faces in the drawings, those skilled in this art should understand that the smooth curved faces are only examples for the convenience of drawing, and in the embodiments of the present invention, it's sufficient as long as the lenses as a whole can cause expected deflection of light, and lenticular lenses, the cylinder surfaces of which are curved faces of irregular surfaces (such as the surfaces having bumps or dents in the shape of wave, triangle or any other shapes), may also be applied.

Figure 3A:
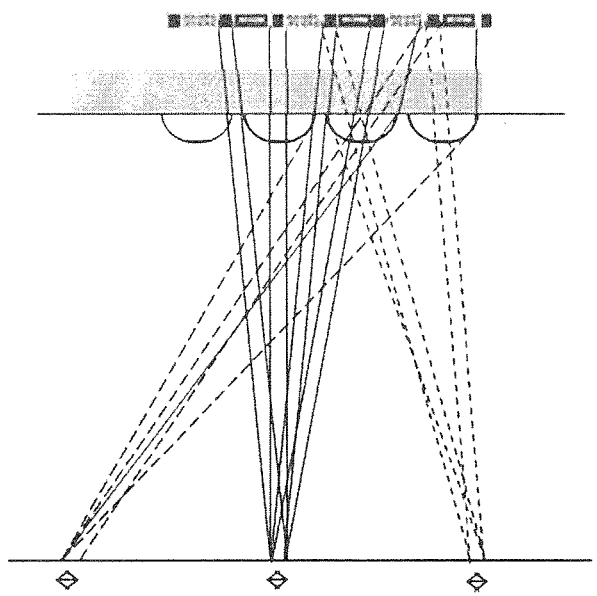
FIG. 3 (a) is a principle schematic view illustrating depression on Moire in the convex lenticular lens grating of embodiment 1.
Figure 3B:
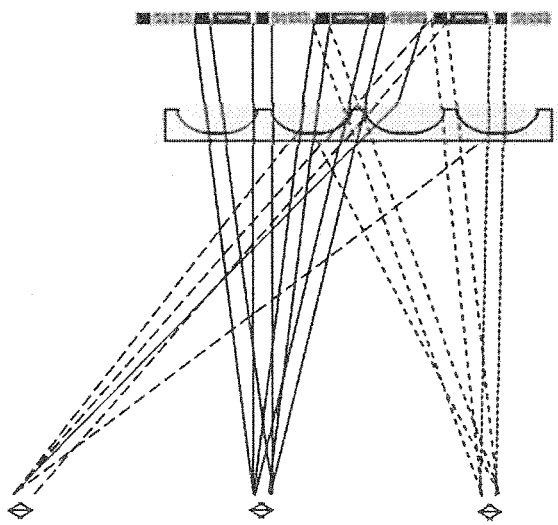

FIG. 3 further illustrates the principle of suppressing Moire by the lenticular lens grating of the structure as shown in FIG. 2. FIG. 3 (a) is a view showing the light path of embodiment 1 having a convex lenticular lens grating, and FIG. 3 (b) is a view showing the light path of embodiment 2 having a concave lenticular lens grating. As can be seen from FIG. 3, when the lenticular lens grating as shown in FIG. 2 of the embodiment of the present invention is used to realize naked-eye 3D display, the existence of the first and second planes makes the light passing through the two planes of the lenticular lens grating not deflected to deform images. In this way, the image formed by the black matrix between pixels will not be amplified along the directions, and only strips substantially corresponding to the actual width of the black matric are formed, and because the actual width of the black matrix is very small, the actual influence caused by the strips can be neglected and the Moire effect can be effectively suppressed accordingly.

Figure 4:
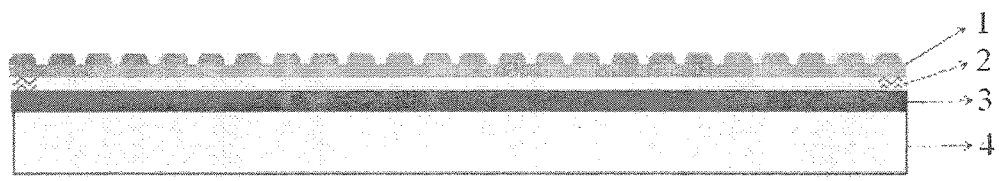
FIG. 4 is a structural view in which the lenticular lens grating of the present invention is installed with the surface facing outward.
Figure 5:
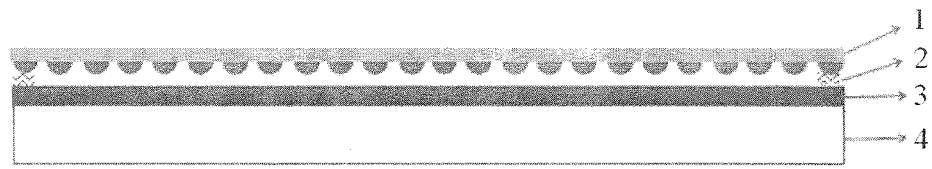
FIG. 5 is a structural view in which the lenticular lens grating of the present invention is installed with the surface facing inward.

There are various assembly manner for the lenticular lens grating of the embodiment of the present invention; as shown in FIG. 4, an assembly manner can be employed so that the upper surface of the lenticular lens grating is opposite to the display panel; alternatively, as shown in FIG. 5, an assembly manner can be employed so that the upper surface of the lenticular lens grating faces the display panel.

In FIG. 4, the cylinder surface of the lenticular lens grating 1 faces outwards, and the bottom surface is adhered onto the polarization sheet 3 using, for example, OCA (optical clear adhesive) optical adhesive 2 and is kept away from the polarization sheet 3 by a certain distance, and the polarization sheet 3 is formed on the display panel 4.

In FIG. 5, the cylinder surface of the lenticular lens grating 1 faces polarization sheet 3, and also is adhered onto the polarization sheet 3 of the display panel 4 using, for example, OCA optical adhesive 2 and is kept away from the polarization sheet 3 by a certain distance, the polarization sheet 3 is formed on the display panel 4; the assembly manner in FIG. 5 in which the surface faces inward can be employed to provide further protection for the film layer of the lens grating.

Embodiment 3

Figure 6:
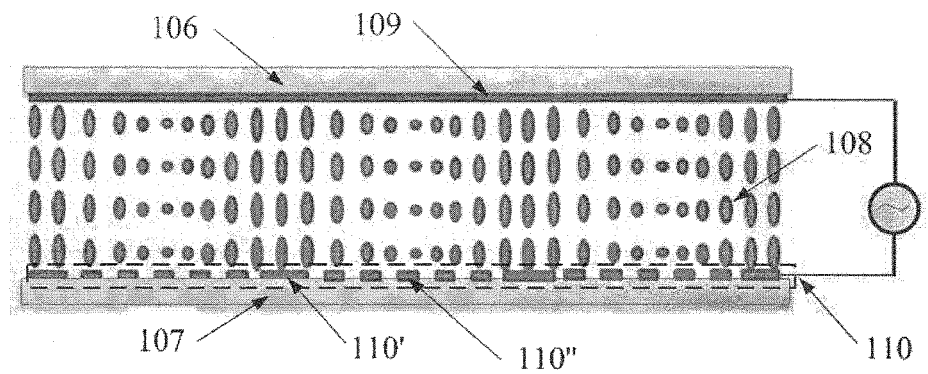
FIG. 6 is a structural view of electrodes of the liquid crystal grating of embodiment 3 of the present invention.

FIG. 6 illustrates embodiment 3 of the present invention, which further discloses an embodiment of a liquid crystal grating. In the liquid crystal grating, mainly by applying voltages to the electrodes on the inner surfaces of the substrates on both sides of the liquid crystal layer, the deflection extent of the liquid crystal molecules in respective regions is controlled, thus an equivalent treatment effect by a lenticular lens grating and the first plane upon light is realized in the liquid crystal layer, which makes the light have different deflection directions when passing through respective regions of the liquid crystal layer.

Specifically, in the embodiment 3 as shown in FIG. 6, the liquid crystal grating 100 comprises an upper substrate 106, a lower substrate 107 as well as a liquid crystal layer 108 located between the upper and lower substrates. A first electrode layer 109 is provided on the inner surface of the upper substrate 106, and a second electrode layer 110 is provided on the inner surface of the lower substrate 107. For example, the first electrode layer 109 is a plain electrode, while the second electrode layer 110 comprises strip electrodes arranged in a parallel and equidistant arrangement; alternatively, the first electrode layer 109 comprises strip electrodes arranged in a parallel and equidistant arrangement, while the second electrode layer 110 is a plain electrode. In this embodiment, illustration is made by taking such an example in which the first electrode layer 109 is a plain electrode, and the second electrode layer 110 comprises strip electrodes arranged in a parallel and equidistant arrangement.

Figure 7:
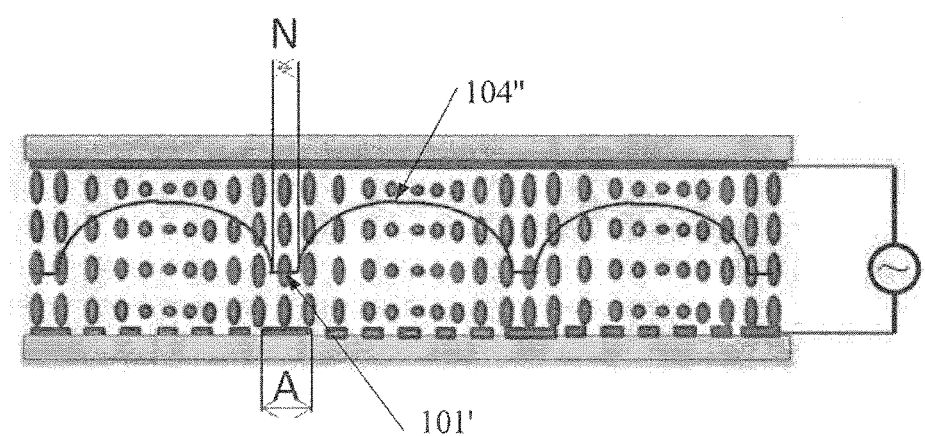
FIG. 7 is a schematic view of embodiment 3 in which the lenticular lens grating is equivalently formed in the liquid crystal layer after voltages are applied to the electrodes of the liquid crystal grating.

As shown in FIG. 7, by applying voltages to the first electrode layer 109 and the second electrode layer 110 so as to form a driving electric field between the upper and lower substrates, deflection of liquid crystal molecules is incurred. Thus, lenticular lenses 104″ are equivalently formed in a parallel arrangement in the liquid crystal layer 108, and a first plane 101′ perpendicular to the central axes of lenticular lenses is equivalently formed between at least two adjacent lenticular lenses. Specifically, the second electrode layer 110 comprises strip electrodes periodically arranged in a parallel and equidistant arrangement, and at least two adjacent strip electrodes constitute one electrode unit. When one electrode unit is composed of two adjacent strip electrodes, the two strip electrodes within each electrode unit are equal in width, and when the width of thus formed first plane 101′ is N, the width A of the strip electrode is greater than the width N of thus formed first plane 101′. When one electrode unit is composed of more than two adjacent strip electrodes, as illustrated in this embodiment and as shown in FIG. 6, the width of the strip electrode 110′ shared by any two adjacent electrode units has a width greater than the width of the other strip electrode 110″ in each electrode unit, and when the width of thus formed first plane 101′ is N, the width A of the strip electrode 110′ is greater than the width N of the thus formed first plane 101′.

The working method of the liquid crystal grating will be described in the following by taking this embodiment as an example. When the liquid crystal grating is in an operation mode, voltages are applied onto the first electrode layer 109 and the second electrode layer 110. The voltage applied to the strip electrode, located at the middle portion of one electrode unit in the second electrode layer, is zero or less than the threshold voltage for liquid crystal deflection, as shown in FIG. 6, that is, the strip electrode 110″ is applied with a voltage which is zero or less than the threshold voltage for liquid crystal deflection. From the strip electrode located at the middle portion of the electrode unit, the voltages applied to the strip electrodes on both sides thereof are increased gradually, and the voltage applied to the strip electrode shared by electrode units is the highest, as shown in FIG. 6, that is, the voltage applied to the strip electrode 110′ is the highest. By controlling the liquid crystal molecules, located between the first electrode layer 109 and the strip electrodes 110′ in the second electrode layer 110, to deflect with the applied voltage, such that the light passing through this portion of liquid crystal molecules do not change in its travel direction, and the first plane is equivalently formed. The deflection of liquid crystal molecules of other portions is controlled so that the light passing through these portions of liquid crystal molecules changes in its travel direction. Thus, lenticular lenses arranged in a parallel arrangement are equivalently formed in liquid crystal regions in these portions.

An electrode unit of the second electrode layer is composed of two periodically parallel and equidistant strip electrodes of an equal width. When the liquid crystal grating is in its operating mode, voltages are applied onto the first electrode layer and the second electrode layer. By applying voltages to the strip electrodes within any electrode unit in the second electrode layer so as to control the liquid crystal molecules right above the strip electrodes deflect, such that the light passing through these portions of liquid crystal molecules do not change in its travel direction, and the first plane is equivalently formed; by controlling the deflection of liquid crystal molecules in other portions such that the light passing through these portions of liquid crystal molecules change in its travel direction, lenticular lenses arranged in a parallel arrangement are equivalently formed in liquid crystal regions in these portions.

It should be noted this embodiment does not limit the number of the strip electrodes in an electrode unit, and those skilled in this art can optionally set the number of the strip electrodes without any creative work according to designing requirements.

Embodiment 4

Figure 8:
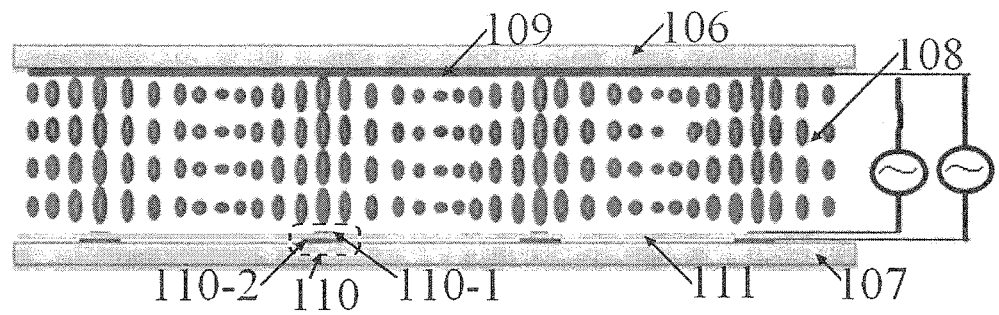
FIG. 8 is a structural view of electrodes of the liquid crystal grating of embodiment 4 of the present invention.

FIG. 8 shows the embodiment 4, which is an embodiment of another liquid crystal grating. The embodiment 4 differs from the embodiment 3 as shown in FIG. 6 mainly in that the structure for the strip electrodes of the second electrode layer 110 is in a double-layered electrode structure.

Figure 9:
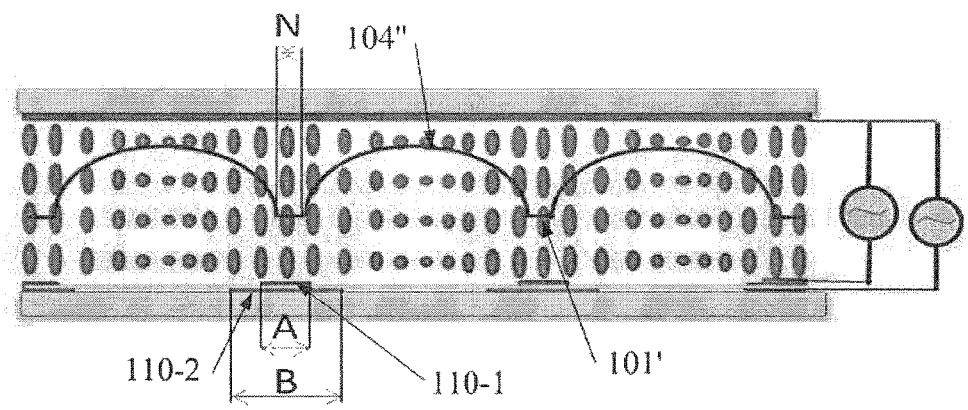
FIG. 9 is a schematic view of embodiment 4 in which the lenticular lens grating is equivalently formed in the liquid crystal layer after voltage is applied to the electrodes of the liquid crystal grating.

Specifically, in embodiment 4, the first electrode layer 109 on the inner surface of the upper substrate 106 is a plain electrode, and the second electrode layer 110 on the inner surface of the lower substrate 107 is of such a structure that double-layered strip electrodes are arranged in a parallel and equidistant arrangement, that is, each double-layered strip electrode is in a double-layered electrode structure composed of an upper electrode and a lower electrode separated with a transparent insulating layer 111 (for example, silicon nitride or the like). As shown in FIGS. 8 and 9, the width A of the upper electrode layer structure 110-1 of the second electrode layer 110 (that is, the length of the short side of the rectangular pattern of the strip electrode) is less than the width B of the lower electrode layer 110-2. By controlling the width of the double-layered strip electrode and adjusting the voltages applied to the first and second two electrodes, lenticular lenses arranged in a parallel arrangement are equivalently formed in the liquid crystal layer 108 between two optional adjacent strip electrodes 110, and a first plane 101' perpendicular to the central axes of the lenticular lenses is equivalently formed between at least two adjacent lenticular lenses; when the width of thus formed first plane 101' is N, the width A of the electrode layer structure 110-1 is greater than the width N of the thus formed first plane 101'. FIG. 9 further illustrates an operation effect drawing of embodiment 4, in which a convex lenticular lens grating 104'' and a first plane 101' are equivalently formed in the liquid crystal layer.

In the embodiment of the present invention, there are various arrangement manners for the electrodes of the liquid crystal grating; as shown in FIGS. 6 and 8, one possible arrangement manner is that the electrode located on the inner surface of the upper substrate is a plain electrode while the electrode on the inner surface of the lower substrate is of such a structure that strip electrodes are arranged in a parallel and equidistant arrangement. In the meantime, with deflection of the liquid crystal molecules caused by applying voltages to the electrodes, convex lenses arranged in a parallel arrangement are equivalently formed in the liquid crystal layer; alternatively, an arrangement manner can be employed in which the electrode on the inner surface of the upper substrate is of such a structure that strip electrodes are arranged in a parallel and equidistant arrangement, while the electrode on the inner surface of the lower substrate is a plain electrode (not shown in the drawings.). Here, with deflection of the liquid crystal molecules caused by applying voltages to the electrodes, concave lenses are equivalently formed in the liquid crystal layer.

Furthermore, in consideration of known situations that the parameters for various display devices, such as dimension, resolution, glass thickness and frame thickness etc, may be entirely distinct from each other, and the grating design technology for 3D display is complicated and can only be used for a certain kind of display device, the embodiments of the present invention further disclose the manufacturing technology of the above lenticular lens grating, such that the lenticular lens grating can be adjusted for display devices of different parameters, thereby simplifying the design technology of 3D display employing a lenticular lens grating.

Figure 10:
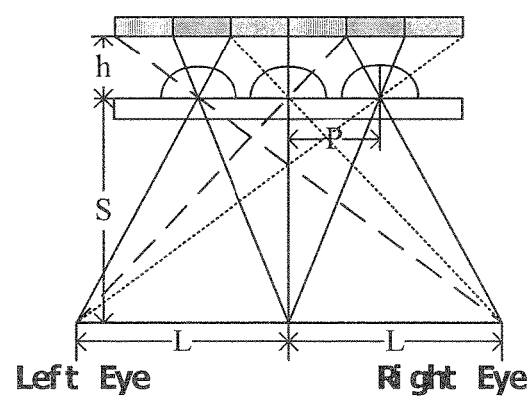
FIG. 10 is a view showing the light path for 3D display of the convex lenticular lens grating of the present invention.

FIG. 10 shows a view for the light path of a convex lenticular lens grating for 3D display. The distance of the grating away from the color filter is h, and the width of the sub-pixel cell of the color filter is Sp (not shown in the drawing), the grid pitch of the grating (the distance between the central axes of two adjacent lenticular lenses, that is, the distance between the center points of two adjacent first planes, or the distance between the center points of two adjacent second planes) is P, the user's interocular distance is 2L (L is a semi-interocular distance, that is, a half of the interocular distance, the interocular distance being a proximate value selected based on statistical results and not an actual interocular distance value of a certain user), and the optimal watching distance for 3D display is S, then the following equations are satisfied according to the relationship between the geometric configurations as shown in the views of light path:

$$\frac{h}{S} = \frac{S_p}{L} \quad (1)$$

$$\frac{P}{2S_p} = \frac{S}{S+h} \quad (2)$$

The distance h of the grating away from the color filter can be derived from equation (1), and then substitute the equation (1) into equations (2) to derive the grid pitch P of the grating:

$$P = \frac{2S_p}{1 + S_p/L} \quad (3)$$

Figure 11:
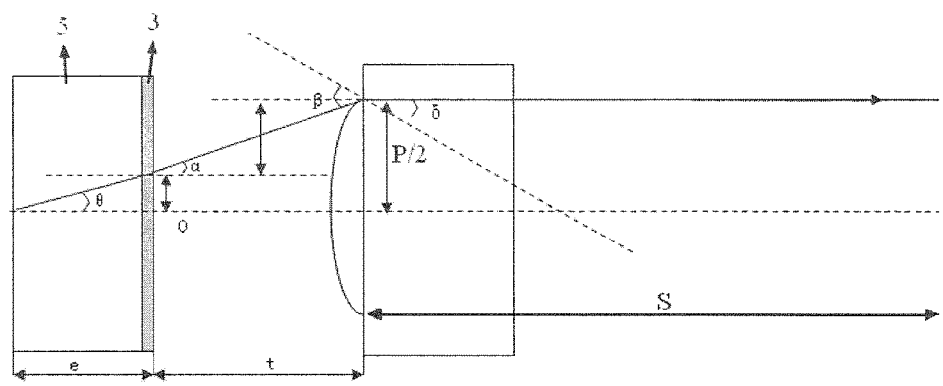
FIG. 11 is a view showing the light path of a single lenticular lens in the convex lenticular lens grating, the surface of which is installed to be facing inward, of the present invention.

FIG. 11 is a view showing the light path of a single lenticular lens of the lenticular lens grating assembled so that the surfaces thereof faces inward. If an optimal display effect is desired for the display device, the focal point of the lenticular lens should be arranged at the transmissive portion of the color filter (that is, the portion where the actual light is emitted after the glass substrate of color filter). The combination thickness of the color filter 5 and the polarization sheet 3 is e, the distance of the grating away from the polarization sheet 3 is t, the emergent angle of the light emitted from the focal point is θ, and the angle is a after the light is refracted by the color filter glasses, the incident angle is β when the light is incident onto the lenticular lens, while the angle is δ after the light is refracted by the lenticular lens, the refraction index of the glass (the color filter and the lenticular lens) is n, the reciprocal value thereof being η=1/n, and then according to the law of refraction and the trigonometric functions, the following result can be obtained:

$$\sin \alpha = \eta \sin \theta \quad (4)$$

$$\sin \delta = \eta \sin \beta \quad (5)$$

$$1 + \cot^2 \alpha = \csc^2 \alpha \quad (6)$$

The following can be derived from equations (4) to (6):

$$\tan \alpha = \frac{\eta \tan \theta}{\sqrt{1 + (1 - \eta^2)\tan^2 \theta}} \quad (7)$$

Subsequently, the following can be derived again based on the geometrical relationship between the configurations:

$$e \tan \theta + t \tan \alpha = P/2 \quad (8)$$

$$\frac{t\eta \tan \theta}{\sqrt{1 + (1 - \eta^2)\tan^2 \theta}} = P/2 - e \tan \theta \quad (9)$$

$$\sin \delta = P/2r \quad (10)$$

An emergent angle θ can be derived by equation (9). Because of sin θ=n*sin α, sin β=sin(α+δ)=n sin δ, it's possible to derive angle δ, then the radius r of the circular arc of the lenticular lens can be derived from equation (10), that is, the radius r can be represented with the grid pitch P, the distance t of the grating away from the polarization sheet, the combination thickness e of the color filter glass substrate and the polarization sheet, and the refractive index n of the color filter and the lenticular lens.

According to the above equations and further in conjunction with specific parameters for design and operation of a display device, such as the distance t of the grating away from the polarization sheet (which distance will affect the entire thickness of the display device), the optimal watching distance S, the continuous horizontal watching distance at the optimal watching distance (which means the horizontal distance of human eyes when people can watch normal 3D pictures while standing at the optimal watching distance S), etc, the grid pitch P of the grating can be calculated, that is, based on the above equation (3), it's possible to derive the actual radius value of the circular arc of the cylinder surface of the lenticular lens, thus achieving the design of a lenticular lens grating with the specific parameters.

Finally, an embodiment of the present invention further provides a display device employing the aforesaid lenticular lens grating or the aforesaid liquid crystal grating for 3D display. The display device may be a liquid crystal panel, an e-paper panel, an organic light-emitting diode (OLED) display panel, a plasma display panel (PDP), a liquid crystal TV, a liquid crystal display, a digital photo frame, a cell phone, a table computer and the any product or parts having the display function.

In the embodiment using the lenticular lens grating, the polarization sheet may not be provided, and for example, the polarization sheet is not necessary for OLED and PDP. In some embodiments of the present invention, with the improved structure of the lenticular lens grating, the black matrix pattern on the color filter will not be deflected to incur deformation due to the deflection of light caused by the lenticular lens, thus effectively depressing Moire effect and notably improving 3D display effect. Furthermore, an embodiment of the present invention further provides a manner for manufacturing the lenticular lens grating, which can reach desirable display effect through flexible regulation of the grating parameters according to the structural features of the display and actual technology, thus greatly reducing the difficulty of technology development, simplifying development procedure and also enhancing the product yield.

The above embodiments are used only for illustrating the present invention, and the actual protective scope of the present invention should be defined by the appended claims.

The invention claimed is:

1. A liquid crystal grating, comprising:
an upper substrate and a lower substrate;
a liquid crystal layer arranged between the upper and lower substrates;
a first electrode layer arranged on an internal surface of the upper substrate and a second electrode layer arranged on an internal surface of the lower substrate;
wherein the first electrode layer is a plain electrode, and the second electrode layer comprises a plurality of electrode units, which are each composed of two or more strip electrodes in parallel and separated from each other within a same plane; or, the second electrode layer is a plain electrode, and the first electrode layer comprises a plurality of electrode units, which are each composed of two or more parallel strip electrodes in parallel and separated from each other within a same plane after the first electrode layer and the second electrode layer of the liquid crystal grating are applied with a voltage, respectively, a lenticular lens grating obtained comprising a plurality of lenticular lenses arranged in parallel,
at least two directly adjacent lenticular lenses have a spacing therebetween, the spacing is in a first planar surface perpendicular to the central axes of the lenticular lenses,
any two directly adjacent electrode units share one strip electrode,
the spacing directly corresponds to the one strip electrode shared by two directly adjacent electrode units,
a width A of the one strip electrode shared by two directly adjacent electrode units is greater than a width of the other strip electrode(s) within each electrode unit, and is greater than the width N of the spacing, and
a voltage applied to the one strip electrode shared by two directly adjacent electrode units is highest,
wherein the liquid crystal grating is located on an external surface of a color filter substrate of a display panel,
the width N of the spacing equals to a width W of a black matrix between color sub-pixel cells on a corresponding color filter of the color filter substrate, and
the width A of the one strip electrode shared by two directly adjacent electrode units is greater than the width W of the black matrix between the color sub-pixel cells on the corresponding color filter of the color filter substrate.

2. The liquid crystal grating according to claim 1, wherein the electrode units are each composed of more than two parallel and equidistant single-layered strip electrodes.

3. The liquid crystal grating according to claim 1, wherein the electrode units are each in a double-layered electrode structure composed of an upper electrode layer and a lower electrode layer separated by a transparent insulating layer, and a width of the upper electrode layer is less than a width of the lower electrode layer.

4. The liquid crystal grating according to claim 1, wherein the lens formed by the liquid crystal grating is a convex lens or a concave lens.

5. A display device, comprising display panel and the liquid crystal grating according to claim 1,
wherein the liquid crystal grating is located on an external surface of the color filter substrate of the display panel.

6. The display device according to claim 5, wherein a grid pitch P of the lenticular lens grating is:

$$P = \frac{2S_p}{1 + S_p/L},$$

where Sp is a width of sub-pixel cells of the color filter, and L is a semi-interocular distance of a user.

7. The display device according to claim 5, further comprising a polarization sheet, wherein the liquid crystal grating is provided on the polarization sheet, and the polarization sheet is provided on the external surface of the color filter substrate of the display panel.

8. The display device according to claim 6, further comprising a polarization sheet, wherein the liquid crystal grating is provided on the polarization sheet, and the polarization sheet is provided on the external surface of the color filter substrate of the display panel.

9. The liquid crystal grating according to claim 1, a grid pitch P of the lenticular lens grating is:

$$P = \frac{2S_p}{1 + S_p/L},$$

where Sp is a width of sub-pixel cells of the color filter, and L is a semi-interocular distance of a user.

* * * * *